United States Patent [19]

Mimken

[11] Patent Number: 4,558,453
[45] Date of Patent: Dec. 10, 1985

[54] SYNCHRONIZATION METHOD AND FREQUENCY HOPPING COMMUNICATION SYSTEM

[75] Inventor: Frederick Mimken, Rochester, N.Y.
[73] Assignee: Harris Corporation, Melbourne, Fla.
[21] Appl. No.: 564,313
[22] Filed: Dec. 22, 1983

Related U.S. Application Data

[63] Continuation of Ser. No. 331,222, Dec. 16, 1981, abandoned.

[51] Int. Cl.⁴ .............................................. H04B 15/00
[52] U.S. Cl. ............................................. 375/1; 455/63; 455/86
[58] Field of Search ...................... 375/1, 2.1, 2.2, 106; 455/29, 32, 62, 63, 65, 71, 86

[56] References Cited

U.S. PATENT DOCUMENTS

| 4,023,103 | 5/1977 | Malm | 455/62 |
| 4,030,033 | 6/1977 | Bibl et al. | 375/1 |
| 4,320,514 | 3/1982 | Haskell | 375/1 |
| 4,328,581 | 5/1982 | Harmon et al. | 455/62 |

Primary Examiner—Benedict V. Safourek
Attorney, Agent, or Firm—L. Lawton Rogers, III

[57] ABSTRACT

A frequency hopping radio frequency communication system and method in which keying (at Time $T_1$) of a transmitter (Tx) automatically initiates the transmission of a predetermined number of cycles ($C_1$–$C_8$) of a sync acquisition signal (W, X, Y and Z) at each of a number of different frequencies (A–G). The receiver (Rx) is being tuned through the same frequencies (A–G) at a relatively slower rate so that the sync acquisition signal is received at each of the receiver frequencies. Upon recognition of the sync acquisition signal and the cycle in which it is received, the receiver anticipates the end of the last cycle of the sync acquisition signal in synchronism with the transmitter and initiates tuning of the transmitter and receiver in accordance with a predetermined pseudorandom code. Additionally, a synchronization maintenance signal is sent approximately every ten seconds to insure that the synchronization between both radios is precisely maintained. Upon termination of a transmission, an "end of message" signal is sent. Depending upon the radio mode selected, both radios will either simultaneously return to the "search" or acquisition mode, in which case resynchronization is required each time the transmitter is keyed, or in which synchronism is retained for a predetermined time ($T_3$–$T_5$ and $T_6$–$T_7$) following transmission to permit receipt of an answer without the necessity of re-establishing synchronism.

26 Claims, 4 Drawing Figures

TEST 1 (N, SIGNAL RECEIVED)
TEST 2 (W, BARKER SEQUENCE)
TEST 3 (X, PSEUDORANDOM CODE)
TEST 4 (Y, PSEUDORANDOM CODE)

SYNCHRONIZATION METHOD AND FREQUENCY HOPPING COMMUNICATION SYSTEM

This is a continuation of application Ser. No. 331,222, filed Dec. 16, 1981 (now abandoned).

Background of the Invention

This invention relates to radio frequency communications systems and more specifically to a system in which the carrier frequency is changed in discrete steps in accordance with a predetermined code.

It is a well known technique in radio frequency communications systems to obtain security in the presence of interference by varying the carrier frequency of the transmitter and the receiver synchronously. Such systems generally employ predetermined pseudorandom codes as to frequency, which codes are periodically changed.

Synchronism remains a problem in such frequency hopping systems where the transmitter and receiver are separated from a common timing source, where the time delays in transmission are significant, where the same frequency cannot be utilized to initiate each transmission as in the presence of jammers, etc. The rate at which the frequencies are changed in such secure systems is far too rapid for timing to be effected based upon conventional timing mechanisms.

Examples of known frequency hopping radio communication systems are disclosed in the Malm U.S. Pat. No. 4,023,103, dated May 10, 1977, the Costanza, et al. U.S. Pat. No. 4,066,964, dated Jan. 3, 1978, the Majeau et al. Pat. No. 3,909,534, dated Sept. 30, 1975, the Maitland et al. U.S. Pat. No. 4,058,677, dated Nov. 15, 1977, and the Lundin et al. U.S. Pat. No. 3,696,207, dated Oct. 3, 1972.

It is accordingly an object of the present invention to obviate the deficiencies of the generally known systems and to provide a novel transceiver and method of frequency hopping radio communication.

It is another object of the present invention to provide a novel transceiver for a frequency hopping radio frequency communication system.

A further object of the present invention is to provide a novel method of synchronizing a remote receiver to a transmitting station.

These and other objects and advantages of the present invention will be apparent from the claims and from the following detailed description when read in conjunction with the appended drawings.

The present invention is directed to a radio frequency communication system in which keying of a transmitter automatically initiates the transmission of a predetermined number of cycles of a sync signal at each of a number of different frequencies. The receiver is being tuned through the same frequencies at a relatively slower rate so that the sync signal is received at each of the receiver frequencies. Upon recognition of the sync signal and the cycle in which it is received, the receiver anticipates the end of the last cycle of the sync signal in synchronism with the transmitter and initiates tuning of the transmitter and receiver in accordance with a predetermined pseudorandom code. Synchronism signals are thereafter periodically sent to correct for differences in the speed of the clocks at the transmitter and receiver. At the end of transmission, an "end of message" signal is sent which, when recognized, indicates to the receiver that synchronism is being retained for a predetermined time following transmission to permit receipt of an answer without the necessity of re-establishing synchronism, or that synchronism is not being maintained so that both transmitter and receiver will revert immediately to the search mode.

Detailed Description of a Preferred Embodiment

Figure 1:
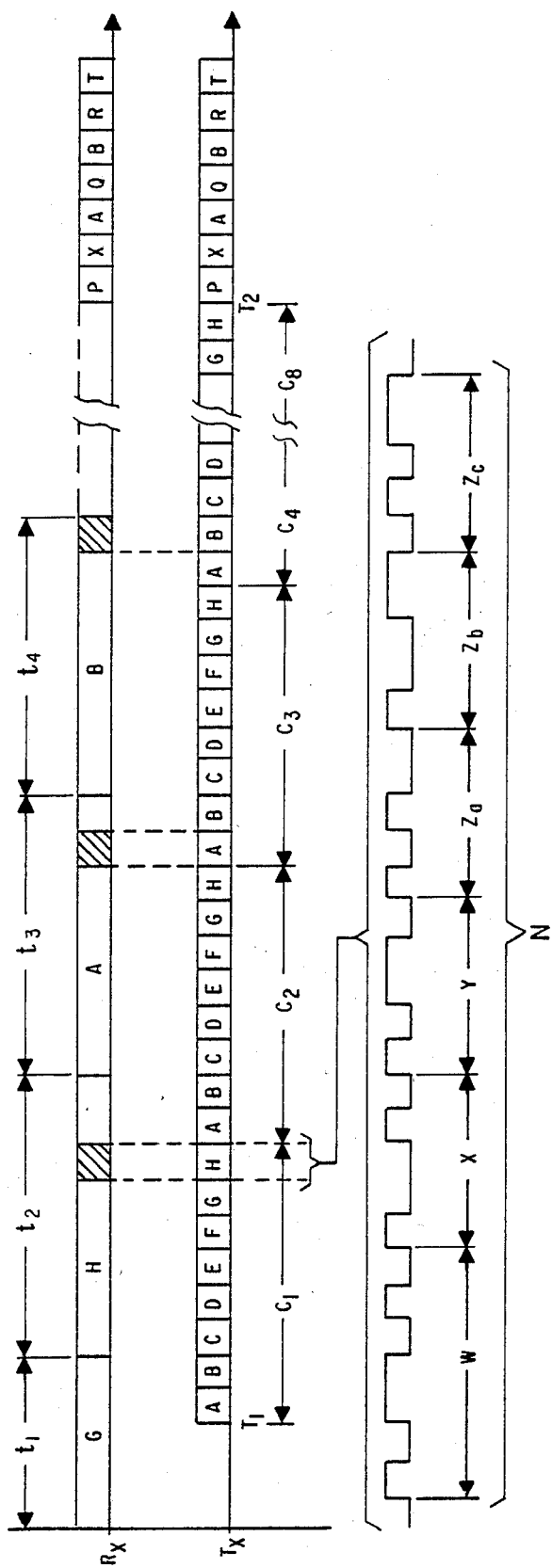
FIG. 1 is a timing diagram illustrating the synchronizing method of the present invention and the content of the sync signal.

With reference to the timing diagram of FIG. 1, the remote receiver is illustrated in line Rx as constantly cycling through eight carrier frequencies in the absence of reception of a recognizable synchronization signal from the transmitter. The period for each frequency is the same and less than about ten milliseconds. In practice, the periods may be in the order of five milliseconds in duration, and may be made variable in pseudorandom or other manner.

It is to be understood that reference herein to the frequency of a receiver is intended to refer to the frequency to which the demodulator of the receiver is tuned. As illustrated in FIG. 1, the remote receiver is tuned in the time period $t_1$ to a frequency indicated as G, to a carrier frequency indicated as H in time period $t_2$, to a frequency indicated as A in time period $t_3$ etc.

It is also to be understood that the number of frequencies in a cycle may be other than eight, and it may be desirable to have the separation of coincident frequencies be a multiple of two because of the use of binary logic.

With continued reference to FIG. 1, the transmitter is illustrated on line Tx as initiating transmission at a time $T_1$ and as transmitting at carrier frequencies A–H repetitively in each of eight consecutive cycles $C_1$–$C_8$. Note that the period of each frequency for the receiver is identical to the period of each cycle of the transmitter so that a transmission at each of the eight frequencies A–H will be made by the transmitter in each of the receiver periods $t_1$–$t_8$, irrespective of the lack of synchronism between the time of the transmitter and receiver. Thus, the receiver in the illustrated example will be tuned to the frequency of the transmitter for one-eighth of each of the eight frequencies to which the receiver is tuned.

With continued reference to FIG. 1, the first cycle $C_1$ of the transmitted signal is received at a frequency H during the period $t_2$, the third cycle of the transmitted signal is received at a frequency A in the time period $t_3$, the signal transmitted in cycle $C_3$ is received during the time period $t_4$ at a frequency B, etc. Because of the lack of synchronization of the transmitter and receiver and the rate at which the frequencies are changed, the portion of each receiver period during which the transmitted signal is received will shift within the period in a predetermined manner. The transmitted signal will, however, be received once during each period of the receiver.

As used herein, the program of sync acquisition utilized by the receiver is referred to as the "slow sync program", and the initial frequency hopping program utilized by the transmitter is referred to as the "fast sync program". Once synchronism is achieved as illustrated at time $T_2$, both the transmitter and receiver will be tuned to the "frequency hopping program" at which the intelligence will be transmitted and received.

With continued reference to FIG. 1, the sync signal transmitted at each of the frequencies A–H during the last sync program may be in the form illustrated. This signal referred to herein as the "sync" signal may be composed of six parts, W, X, Y, Za, Zb, and Zc as illustrated. The parts W, X and Y may be identical in a given communication network for each of the sync signals, with the part Z varying slightly as will hereinafter be described in greater detail.

By way of example, the signal contained in the W portion may be tested by the receiver to determine if a signal has been received, i.e., does the signal comprise pulses and spaces as contrasted with noise. Similarly, the portion X of the signal may be tested by the receiver to determine whether a first predetermined pseudorandom code has been received. The signal in the portion Y may also be tested by the receiver for conformity with a predetermined pseudorandom code.

The portion Z of the sync signal differs for each cycle $C_1$–$C_8$ of the transmitter and is tested at the receiver to determine if the data received is valid by means of error code connection techniques. Information in portion $Z_a$ defines the cycle in which the sync signal is transmitted. Additionally, the $Z_b$ portion of the signal may be used to update the pseudorandom code, i.e. to alter the starting point thereof, each time a new synchronization signal is transmitted. The $Z_c$ portion may contain the error correction bits, e.g. to correct two errors in the $Z_a$ and $Z_b$ portions and to invalidate the signal if three errors are detected, all in a conventional manner.

In a practical example, the sync signal may contain 32 bits; the first seven of which represent a Barker sequence, the next ten of which represent a pseudorandom code, and the remaining bits identify the cycle of the fast sync program in which the signal is transmitted and contain the other information discussed above.

In such an example, each of the 32 bits may be divided in a well known manner into eight segments evaluated as to their representation of a binary "1" or "0" (test 1).

The first seven bits may also be tested as a Barker sequence (test 2), as may the next four bits plus a parity bit for compliance with a first predetermined pseudorandom code (test 3), and the following four bits plus a parity bit tested for compliance with a second predetermined pseudorandom code (test 4). If the W, X and Y portions of the sync signal meet all of these four tests, a series of windows are set up to look for frequency coincidence during the next time period t.

Figure 2:
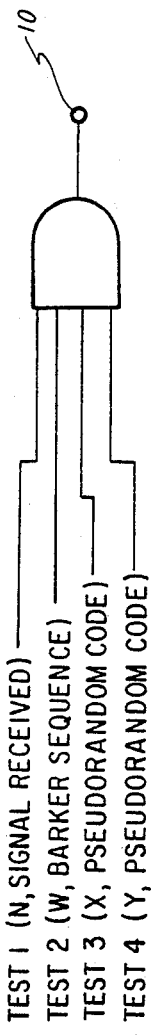
FIG. 2 is a schematic circuit diagram illustrating exemplary tests in evaluating the sync signal.

As shown schematically in FIG. 2, the successful completion of all four tests of the portions W, X, and Y of the sync signals provide four different evaluations of the received signal and may be used to initiate the evaluation of the portion Z of the sync signal.

In the example illustrated in FIG. 1, assume reception occurred during the brief time interval when the receiver and transmitter were tuned to the same frequency H and that no sync signal was received due to noise, etc. Assume further that the sync signal being transmitted in cycle $C_3$ at frequency A is received and successfully evaluated in accordance with the previously described tests.

The presence of a signal on terminal 10 of FIG. 2 will cause a window to open for receipt of the sync signal at a frequency B where the tests will be repeated. Assume that the tests at frequency B in the time interval $t_4$ are successful, or alternatively that the tests of the sync signal received at a frequency C during the time interval $t_5$ are successful, the logic at the receiver will evaluate the part Z of the sync signal for its cycle and anticipate the termination of the fast sync program and the initiation of the frequency hopping program at time $T_2$. If the receiver determines from the evaluation of the portion Z of the sync signal that the data received in two of the eight previous time periods t is valid, it will ascertain the cycle of the transmitter from the sync signal and determine the time period remaining until the end of the transmission of the last cycle $C_8$ of the fast sync program.

With continued reference to FIG. 1, the transmitter, upon the termination of cycle eight, will immediately commence a pseudorandom frequency hopping program at the point on the code indicated by the Z portion of the signal. By determining in which cycle the transmitted sync signal has been received and decoded, the receiver may anticipate the commencement of the predetermined pseudorandom frequency hopping program and initiate the same program from the same starting point in synchronism with the program at the transmitter, at time $T_2$. Thereafter, the transmitter and receiver will remain synchronized throughout the duration of the transmission.

Once initiated, the frequency hopping programs at the transmitter and receiver will continue so long as a signal is being transmitted or received and for a predetermined time interval following the last transmission or reception of a signal. This delay before dropping out of synchronism permits one station to terminate a transmission and to thereafter receive a signal from the second station without the necessity for resynchronization. If, however, the delay between transmission and reception is excessive, the receiver at the first station will resume operation in the sync acquisition mode under the control of the slow sync program. Similarly, if the delay between reception and transmission is excessive, the keying of the transmitter at the second station will initiate the eight cycle sync acquisition transmission in accordance with the fast sync program.

In a preferred embodiment, the release of the transmitter key effects the automatic transmission of an "end of message" signal. This "end of message" signal may be used to tell the receiver when to revert to the search mode or slow sync program.

For example, the "end of message" signal may comprise eight sequential broadcasts of the synchronization signal N shown in FIG. 1. Should the receiver recognize the signal N in two out of the eight time periods, the receiver will know that the transmitter is either immediately reverting to the search mode or delaying an appropriate time as programmed. A manual switch may be used, e.g. to switch between a zero and a 2.5 second delay. While the delay as discussed above is preferable, it is possible that interference will cause the receiver to attempt to maintain synchronization when no valid transmission is occurring. In such circumstances, the receiver can be switched to the zero delay mode.

Figure 4:
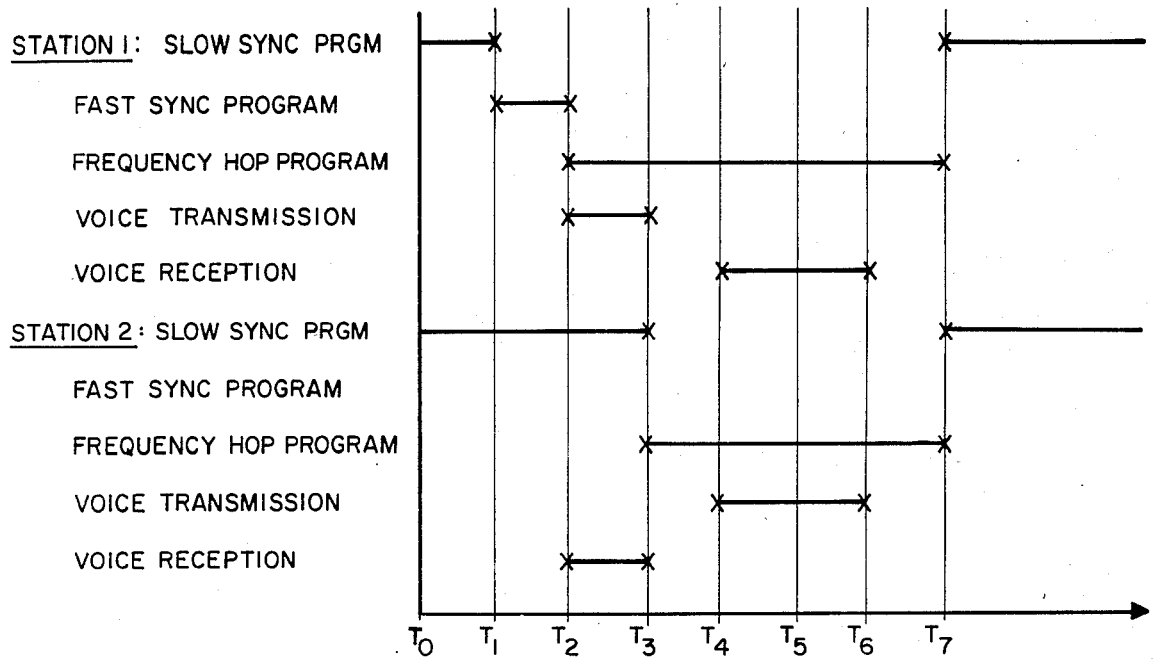
FIG. 4 is a timing diagram which illustrates the sequence of operations performed by the transceiver of FIG. 3.
Figure 3:
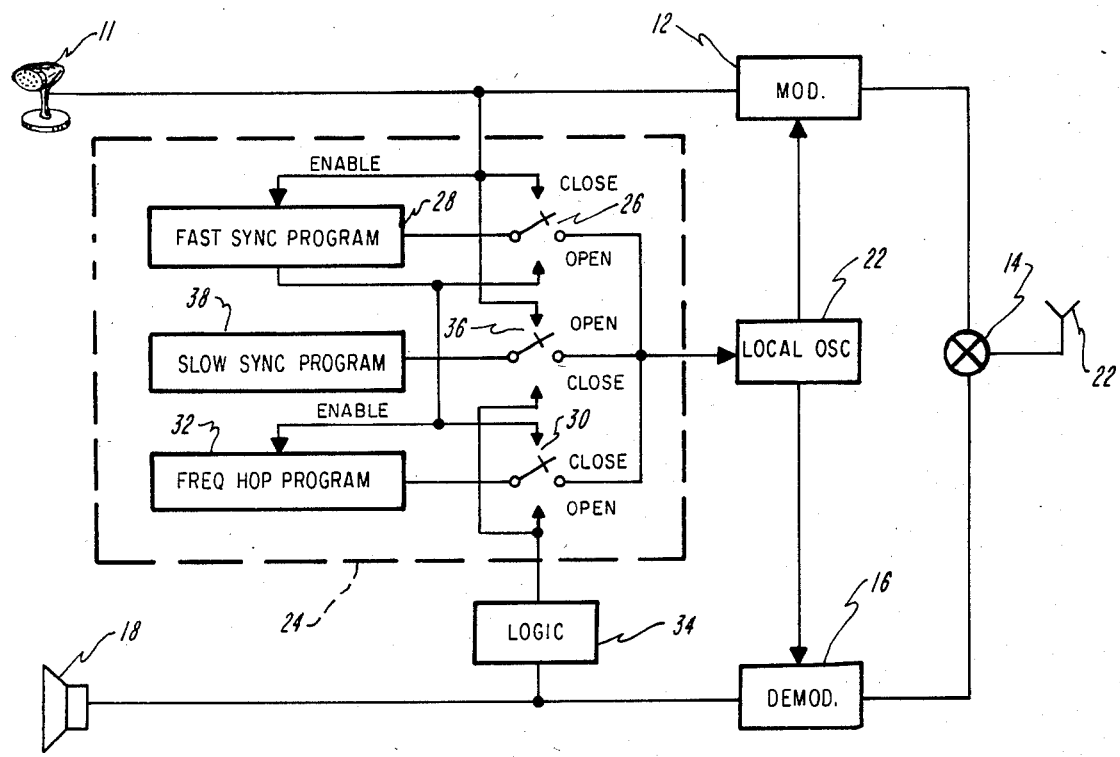
FIG. 3 is a functional block diagram schematically illustrating the operation of a transceiver constructed in accordance with the present invention.

A functional block diagram is shown in FIG. 3, and may be understood with reference to the timing diagram of FIG. 4 to illustrate the operation of a transceiver to accomplish the sync recognition and a frequency hopping transmission as described above. With reference to FIGS. 3 and 4, a microphone 11 is connected to the input terminal of a modulator 12 and the output therefrom applied to one input terminal of a T/R switch 14. The other terminal of the T/R switch 14 is connected through a demodulator 16 to a speaker 18. The T/R switch 14 is also connected to an antenna 20. Both the modulator 12 and demodulator 16 may be driven by the same local oscillator 22 in accordance with control signals from the control means 24.

As thus far described, each of the elements may be any suitable conventional device operative to modulate a carrier frequency with a voice signal from the microphone 11 and to convey the modulated signal through the T/R switch 14 for transmission from the antenna 20. The receipt of a signal by the antenna 20 will be passed through the T/R switch 14, demodulated in a conventional manner in the demodulator 16 to drive the speaker 18 or other suitable output device.

With continued reference to FIG. 3 and the timing diagram of FIG. 4, both Station 1 and Station 2 are operating under control of the slow sync program at time $T_0$. At time $T_1$ the microphone at Station 1 is keyed to immediately initiate the "fast sync program" and to broadcast the eight complete cycles thereof in the time intervals $T_1$–$T_2$.

As shown in FIG. 3, the presence of a signal from the microphone 11 will close the normally open switch 26 to place the local oscillator 22 under the control of the fast sync program means 26. No change in the operation of the receiver at Station 2 is made during the period $T_1$–$T_2$.

At the conclusion of the fast sync program, the Station 1 immediately enables the predetermined pseudorandom frequency hop program means until voice transmission is terminated at time $T_3$ and beyond as will be explained. Having recognized and established synchronism during the period $T_1$–$T_2$, Station 2 initiates the same predetermined pseudorandom frequency hop program at time $T_2$.

With reference to FIG. 3, the fast sync program means 28, upon the completion of the fast sync program, opens the switch 26 to disconnect the local oscillator 22. At the same time, the normally open switch 30 closes to connect the frequency hop program means 32 to the oscillator 22 and to enable frequency hop program means 32.

With reference again to FIG. 4, the termination of voice transmission at time $T_3$ will initiate a delay period $T_3$–$T_5$. If a signal is received by Station 1 within the time period $T_3$–$T_5$, e.g., time $T_4$, both Station 1 and Station 2 will continue the hop program until voice transmission terminates at time $T_6$.

As shown in FIG. 3, receipt of a signal from Station 2 by the antenna 20 will, through the logic circuit 34, maintain switch 30 closed for a predetermined time interval. This delay circuit may be reset by the presence of an output signal from the demodulator 16. In the absence of such a reset, the delay circuit will time out, open the switch 30 and close the switch 36 to connect the local oscillator 22 to the slow sync program means 38.

With reference again to FIG. 4, a delay period is initiated by the end of voice transmission by Station 2 at time $T_6$. If, as shown in FIG. 4, voice transmission is not reinitiated by Station 1 before the end of the delay period at time $T_7$, Station 1 reverts to the slow sync program under control of the slow sync program means 38 of FIG. 3. Similarly, the lack of the reception of a signal by Station 2 will revert Station 2 to the slow sync program.

As shown in FIG. 3, the timing out of the delay in the logic circuit 34 disconnects the frequency hop program means 32 from the local oscillator 22 and connects the slow sync program means 38 thereto by way of switch 36.

The circuit of FIG. 3 may include an evaluation circuit which recognizes an "end of message" signal indicating that Station 2 will revert to the slow sync program at time $T_7$ unless a transmission is received from Station 1 prior thereto. If so, Station 1 will itself revert to the slow sync program at time $T_7$. In this way, the period during which Station 1 and Station 2 can be attempting to operate in different modes may be essentially eliminated.

It is to be understood that the period of delay before reverting to the slow sync program may be varied discretely from zero to about three seconds, manually or automatically as a function of information contained in the "end of message" signal.

It is also to be understood that additional sync signals may be automatically injected into any transmission at periodical intervals to eliminate problems of drift between the clock circuits of the two stations. For example, the signal N may be sent sequentially two times without being detected in the audio signal. The same recognition circuit may be used for sync acquisition, sync maintenance and recognition of the "end of message" signal.

It is to be understood that the circuits for effecting the switch closures schematically illustrated in FIG. 3 may be made by any suitable conventional electronic means including the use of programmed or programmable devices. Similarly, the number of frequencies illustrated in FIG. 1 in the slow sync and fast sync programs may be varied without departing from the scope of the present invention. The pseudorandom code of the frequency hop program may be of any length and character. It is also to be understood that other and/or additional tests may be used in the evaluation of the sync signal by the receiver through the use of any suitable conventional logic circuits.

The present sync acquisition method is advantageous in its security and reliability. It is secure in that the carrier frequency is repeatedly changed at a relatively rapid rate to avoid random or periodic interference. It is reliable in that the sync signal is tested in a number of different ways in a short period of time. Moreover, synchronization is rapidly achieved without sacrificing either security or reliability. It is thus possible for a station to come up, provide a synchronizing signal for a remote receiver, to transmit a signal and to receive a reply in a relatively brief period of time.

As indicated above, the present invention may be embodied in a number of different configurations and many such modifications will occur to those skilled in the art from the foregoing. The above description is therefore to be taken as illustrative rather than limiting and the scope of the invention defined by the appended claims when accorded a full range of equivalents.

What is claimed is:

1. A method of synchronizing a receiver to a remote transmitter for frequency hopping radio communications comprising the steps of:

(a) tuning the receiver to receive signals at M successive discrete frequencies at a rate N;

(b) detecting a predetermined sync acquisition signal at not less than two of the M discrete frequencies within a predetermined time interval initiated responsively to the first detection of the sync acquisition signal;

(c) tuning the receiver to receive signals at P successive discrete frequencies at a rate Q responsively to the detection of the sync acquisition signal at the second one of the M discrete frequencies, P being at least twice M and Q being at least twice N, to thereby initially synchronize the receiver for frequency hopping communications with a remote transmitter;

(d) detecting a sync maintenance signal at not less than two of the P discrete frequencies within a predetermined time period initiated responsively to the first detection of the sync maintenance signal;

(e) adjusting the time of shifting of the P discrete frequencies responsively to the detection of the sync maintenance signals to thereby maintain synchronization between the receiver and the remote transmitter.

2. The method of claim 1 including the further step of transmitting at a continuation of the P successive discrete frequencies at the rate Q.

3. The method of claim 2 including the further step of tuning the receiver to receive at a continuation of the P successive discrete frequencies at the rate Q for a predetermined time interval following the transmission.

4. The transceiver of claim 1 wherein the sync acquisition and sync maintenance signals are substantially the same.

5. The transceiver of claim 4, including the step of transmitting an "end of message" signal upon the end of each transmission.

6. The transceiver of claim 5 including the step of continuing the tuning programs for the receiver for approximately two seconds following receipt of the "end of message" signal.

7. The transceiver of claim 5 including the step of continuing the tuning program for the receiver for a period of time following receipt of the "end of message" signal related to the control of the "end of message" signal.

8. The transceiver of claim 1 including the step of transmitting an "end of message" signal upon the end of each transmission.

9. A transceiver for a frequency hopping radio communication system comprising:
a first frequency hopping program of predetermined length consisting of M discrete frequencies changing at N rate;
a second frequency hopping program of predetermined length consisting of P discrete frequencies changing at Q rate, P being greater than M and Q being greater than N;
a third frequency hopping program of predetermined length consisting of M discrete frequencies changing at O rate where O is greater than N;
means for generating a predetermined sync acquisition signal and a predetermined sync maintenance signal;
means for recognizing the receipt of said predetermined sync signals;
switch keyed transmitter means; and
receiver means,
said receiver means being normally tuned by said first frequency hopping program, being disabled responsively to the keying of said transmitter means for the duration of the transmission, and being tuned by said second frequency hopping program in response to said sync signal recognizing means,
said transmitter means being tuned to said third frequency hopping program by the keying thereof to transmit responsively to said sync signal generating means, being tuned to said second frequency program responsively to the completion of the transmission of said sync signal, and being tuned to said second frequency hopping program if keyed within a predetermined time interval following receipt of a signal in said second frequency hopping program.

10. The transceiver of claim 9 wherein O is approximately MN.

11. The transceiver of claim 9 wherein P is at least an order of magnitude greater than M.

12. A transceiver for a frequency hopping radio communication system comprising:
transmitter means;
receiver means;
means responsive to said transmitter means for disabling said receiver means; and
tuning means,
said tuning means being responsive to a predetermined first condition of said transmitter means to initiate the transmission of a sync signal in accordance with a first predetermined discrete frequency hopping program,
said tuning means being responsive to the termination of said first frequency hopping program to initiate a second predetermined discrete frequency hopping program,
said tuning means being responsive to receipt of a sync acquisition signal at a plurality of discrete frequencies in a third frequency program for initiating a second predetermined discrete frequency hopping program at a time dependent upon the frequencies at which said sync signal is received,
said tuning means being responsive to receipt of a sync maintenance signal at a plurality of discrete frequencies in said second frequency hopping program to adjust the time of frequency shift in said second frequency hopping program.

13. The transceiver of claim 12 wherein said first predetermined discrete frequency hopping program includes a series of M predetermined discrete frequencies transmitted at a first predetermined rate N; and
wherein said second predetermined discrete frequency hopping program includes a series of P predetermined discrete frequencies transmitted at a second predetermined rate Q, P being greater than M, and Q being greater than N.

14. The transceiver of claim 13 wherein said third predetermined frequency hopping program includes a series of M predetermined discrete frequencies transmitted at a predetermined rate O, and
wherein N is large relative to O.

15. The transceiver of claim 14 wherein said rate N is approximately M times that of said rate O.

16. Apparatus for synchronizing a receiver to a remote transmitter for frequency hopping radio communications comprising:
 means for tuning the receiver to receive signals at M successive discrete frequencies at a rate N;
 means for detecting a predetermined sync acquisition signal at not less than two of the M discrete frequencies within a predetermined time interval initiated responsively by first detection of the sync acquisition signal;
 means for tuning the receiver to receive signals at P successive discrete frequencies at a rate Q responsively to said sync acquisition signal detecting means, P being at least twice M and Q being at least twice N, to thereby initially synchronize the receiver for frequency hopping communications with a remote transmitter;
 means for detecting a sync maintenance signal at not less than two of the P discrete frequencies within a predetermined time period initiated responsively to the first detection; and
 means for adjusting the time of shifting of the P discrete frequencies responsively to said sync maintenance signal detecting means to thereby maintain synchronization between the receiver and the remote transmitter.

17. The apparatus of claim 16 including means for detecting an "end of message" signal and for tuning the receiver to receive signals at M successive discrete frequencies at a rate N in response thereto.

18. The apparatus of claim 17 including means for delaying a predetermined amount the tuning of a receiver to receive signals at M successive discrete frequencies at a rate N.

19. The apparatus of claim 18 wherein the amount of delay is responsive to said "end of message" signal.

20. A transceiver for a frequency hopping radio communication system comprising:
 means for providing a sync acquisition signal, a sync maintenance signal, an "end of message" signal, a slow frequency hopping program of M discrete frequencies at a rate N, a fast frequency hopping program of P discrete frequencies at a rate Q, and a sync frequency hopping program of R frequencies at a rate S;
 a keyed transmitter;
 means (a) for tuning said transmitter to transmit said sync acquisition signal at said sync frequency hopping program upon keying of said transmitter, and (b) for tuning said transmitter to transmit audio frequency signals at said fast frequency hopping program upon completion of said sync frequency hopping program;
 a receiver;
 means for detecting said sync acquisition signal, said sync maintenance signal and said "end of message" signal;
 means for tuning said receiver (a) to receive normally at said slow frequency hopping program, (b) to receive at said fast frequency hopping program in response to detection of said sync acquisition signal, (c) to receive at said slow frequency hopping program in response to detection of said "end of message" signal, and (d) to shift in time said fast frequency hopping program in response to detection of said sync maintenance signal.

21. A method of synchronizing a receiver to a transmitter for frequency hopping radio communications comprising the steps of:
 (a) tuning the receiver the receive signals at M successive discrete frequencies at a rate N;
 (b) detecting a predetermined sync acquisition signal;
 (c) tuning the receiver to receive signals at P successive discrete frequencies at a rate Q responsively to the detection of the sync acquisition signal, P being at least twice M and Q being at least twice N, to thereby initially synchronize the receiver for frequency hopping communications with a remote transmitter;
 (d) detecting a sync maintenance signal; and
 (e) adjusting the time of shifting of the P discrete frequencies responsively to the detection of the sync maintenance signal to thereby maintain synchronization between the receiver and the remote transmitter.

22. The method of claim 21 including the further step of transmitting at a continuation of the P successive discrete frequencies at the rate Q.

23. The method of claim 22 including the further step of tuning the receiver to receive at a continuation of the P successive discrete frequencies at the rate Q for a predetermined time interval following the transmission.

24. Apparatus for synchronizing a receiver to a remote transmitter for frequency hopping radio communications comprising:
 means for tuning the receiver to receive signals at M successive discrete frequencies at a rate N;
 means for detecting a predetermined sync acquisition signal;
 means for tuning the receiver to receive signals at P successive discrete frequencies at a rate Q responsively to said sync acquisition signal detecting means, P being at least twice M and Q being at least twice N, to thereby initially synchronize the receiver for frequency hopping communications with a remote transmitter;
 means for detecting a sync maintenance signal; and
 means for adjusting the time of shifting of the P discrete frequencies responsively to said sync maintenance signal detecting means to thereby maintain synchronization between the receiver and the remote transmitter.

25. The apparatus of claim 24 including means for detecting an "end of message" signal and for tuning the receiver to receive signals at M successive discrete frequencies at a rate N in response thereto.

26. The apparatus of claim 25 including means for delaying a predetermined amount the tuning of a receiver to receive signals at M successive discrete frequencies at a rate N.

* * * * *